(12) United States Patent
Arnold et al.

(10) Patent No.: US 6,954,260 B2
(45) Date of Patent: Oct. 11, 2005

(54) SYSTEMS AND METHODS FOR ILLUMINATING A PLATEN IN A PRINT SCANNER

(75) Inventors: Joseph F. Arnold, Palm Beach Gardens, FL (US); John F. Carver, Hobe Sound, FL (US); Trent G. Francis, Boynton Beach, FL (US); Richard D. Irving, Palm Beach Gardens, FL (US); George W. McClurg, Jensen Beach, FL (US); Walter G. Scott, North Palm Beach, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 59 days.

(21) Appl. No.: 10/050,046

(22) Filed: Jan. 17, 2002

(65) Prior Publication Data

US 2003/0133103 A1 Jul. 17, 2003

(51) Int. Cl.[7] ............................................. G06K 9/74
(52) U.S. Cl. ......................... 356/71; 382/124; 382/127
(58) Field of Search ............................... 356/71; 359/15, 359/566; 362/31, 552, 555, 558; 382/124

(56) References Cited

U.S. PATENT DOCUMENTS

| 2,500,017 A | 3/1950 | Altman |
| 3,200,701 A | 8/1965 | White |
| 3,475,588 A | 10/1969 | McMaster |
| 3,482,498 A | 12/1969 | Becker |

(Continued)

FOREIGN PATENT DOCUMENTS

| EP | 0 101 772 A1 | 3/1984 | |
| EP | 0 308 162 A2 A3 | 3/1989 | ............ A61B/5/10 |
| EP | 0 379 333 A1 | 7/1990 | |
| EP | 0 623 890 A2 A3 | 11/1994 | |

(Continued)

OTHER PUBLICATIONS

IBM Technical Disclosure Bulletin, IBM Corp., Oct. 1986, vol. 29, No. 5, pp. 1–3.
English–language Abstract of Japanese Patent Publication No. 01–205392, from http://www1.ipdl.jpo.go.jp, 1 Page (Aug. 17, 1989—Date of publication of application).
English–language Abstract of Japanese Patent Publication No. 03–161884, from http://www1.ipdl.jpo.go.jp, 2 Pages (Jul. 11, 1991—Date of publication of application).

(Continued)

*Primary Examiner*—Michael P. Stafirn
*Assistant Examiner*—Juan D Valentin, II
(74) *Attorney, Agent, or Firm*—Sterne, Kessler, Goldstein & Fox P.L.L.C.

(57) ABSTRACT

Systems and methods for illuminating a platen are provided. A hybrid illumination system uses both diffusion and collimation to efficiently provide a flat, uniform illumination at a platen. One or more diffusers are disposed between the illumination source array and a collimating lens. An illumination system is provided which uses diffused light to illuminate a platen in a print scanner. The illumination system has an illumination source array and a light wedge. The light wedge reflects light internally which makes the illumination even more diffuse. An illumination source array has a plurality of sources that emit blue/green light. In one preferred example, the blue/green light is equal to or approximately equal to 510 nm. Sources are divided into at least a center region and a perimeter region. The density of sources provided in the perimeter region is greater than in the center region to correct for natural light falloff in the illumination system. Intensity control can be preformed individually or in groups.

13 Claims, 8 Drawing Sheets

U.S. PATENT DOCUMENTS

| | | |
|---|---|---|
| 3,495,259 A | 2/1970 | Rocholl et al. |
| 3,527,535 A | 9/1970 | Monroe |
| 3,540,025 A | 11/1970 | Levin et al. |
| 3,617,120 A | 11/1971 | Roka |
| 3,699,519 A | 10/1972 | Campbell |
| 3,743,421 A * | 7/1973 | Maloney ............... 356/71 |
| 3,906,520 A | 9/1975 | Phillips |
| 3,944,978 A * | 3/1976 | Jensen et al. ............ 356/71 |
| 3,947,128 A | 3/1976 | Weinberger et al. |
| 3,968,476 A | 7/1976 | McMahon |
| 3,975,711 A | 8/1976 | McMahon |
| 4,032,975 A | 6/1977 | Malueg et al. |
| 4,063,226 A | 12/1977 | Kozma et al. |
| 4,120,585 A | 10/1978 | DePalma et al. |
| 4,152,056 A | 5/1979 | Fowler |
| 4,209,481 A | 6/1980 | Kashiro et al. |
| 4,210,899 A | 7/1980 | Swonger et al. |
| 4,253,086 A | 2/1981 | Szwarcbier |
| 4,322,163 A | 3/1982 | Schiller |
| 4,414,684 A | 11/1983 | Blonder |
| 4,537,484 A * | 8/1985 | Fowler et al. ............ 356/71 |
| 4,544,267 A * | 10/1985 | Schiller ................. 356/71 |
| 4,553,837 A | 11/1985 | Marcus |
| 4,601,195 A | 7/1986 | Garritano |
| 4,669,487 A | 6/1987 | Frieling |
| 4,681,435 A | 7/1987 | Kubota et al. |
| 4,684,802 A | 8/1987 | Hakenewerth et al. |
| 4,701,772 A | 10/1987 | Anderson et al. |
| 4,783,823 A | 11/1988 | Tasaki et al. |
| 4,784,484 A | 11/1988 | Jensen |
| 4,792,226 A | 12/1988 | Fishbine et al. |
| 4,811,414 A | 3/1989 | Fishbine et al. |
| 4,876,726 A | 10/1989 | Capello et al. |
| 4,905,293 A | 2/1990 | Asai et al. |
| 4,924,085 A | 5/1990 | Kato et al. |
| 4,933,976 A | 6/1990 | Fishbine et al. |
| 4,942,482 A | 7/1990 | Kakinuma et al. |
| 4,946,276 A | 8/1990 | Chilcott |
| 4,995,086 A | 2/1991 | Lilley et al. |
| 5,054,090 A | 10/1991 | Knight et al. |
| 5,067,162 A | 11/1991 | Driscoll, Jr. et al. |
| 5,067,749 A | 11/1991 | Land |
| 5,131,038 A | 7/1992 | Puhl et al. |
| 5,146,102 A | 9/1992 | Higuchi et al. |
| 5,157,497 A | 10/1992 | Topper et al. |
| 5,177,353 A * | 1/1993 | Schiller ................. 356/71 |
| 5,185,673 A | 2/1993 | Sobol |
| 5,187,747 A | 2/1993 | Capello et al. |
| 5,210,588 A * | 5/1993 | Lee ..................... 356/71 |
| 5,222,152 A | 6/1993 | Fishbine et al. |
| 5,222,153 A | 6/1993 | Beiswenger |
| 5,230,025 A | 7/1993 | Fishbine et al. |
| 5,233,404 A | 8/1993 | Lougheed et al. |
| 5,249,370 A | 10/1993 | Stanger et al. |
| 5,253,085 A | 10/1993 | Maruo et al. |
| 5,261,266 A | 11/1993 | Lorenz et al. |
| 5,285,293 A | 2/1994 | Webb et al. |
| 5,291,318 A | 3/1994 | Genovese |
| D348,445 S | 7/1994 | Fishbine et al. |
| 5,351,127 A | 9/1994 | King et al. |
| D351,144 S | 10/1994 | Fishbine et al. |
| 5,363,318 A | 11/1994 | McCauley |
| 5,384,621 A | 1/1995 | Hatch et al. |
| 5,412,463 A | 5/1995 | Sibbald et al. |
| 5,416,573 A | 5/1995 | Sartor, Jr. |
| 5,448,649 A | 9/1995 | Chen et al. |
| 5,467,403 A | 11/1995 | Fishbine et al. |
| 5,469,506 A | 11/1995 | Berson et al. |
| 5,471,240 A | 11/1995 | Prager et al. |
| 5,473,144 A | 12/1995 | Mathurin, Jr. |
| 5,483,601 A | 1/1996 | Faulkner |
| 5,509,083 A | 4/1996 | Abtahi et al. |
| 5,517,528 A | 5/1996 | Johnson |
| 5,528,355 A | 6/1996 | Maase et al. |
| 5,548,394 A * | 8/1996 | Giles et al. ............. 356/71 |
| 5,591,949 A | 1/1997 | Bernstein |
| 5,596,454 A | 1/1997 | Hebert |
| 5,598,474 A | 1/1997 | Johnson |
| 5,613,014 A | 3/1997 | Eshera et al. |
| 5,615,277 A | 3/1997 | Hoffman |
| 5,625,448 A | 4/1997 | Ranalli et al. |
| 5,640,422 A | 6/1997 | Johnson |
| 5,649,128 A | 7/1997 | Hartley |
| 5,650,842 A | 7/1997 | Maase et al. |
| 5,661,451 A | 8/1997 | Pollag |
| 5,680,205 A | 10/1997 | Borza |
| 5,689,529 A | 11/1997 | Johnson |
| 5,717,777 A | 2/1998 | Wong et al. |
| 5,726,443 A * | 3/1998 | Immega et al. .......... 250/227.2 |
| 5,729,334 A | 3/1998 | Van Ruyven |
| 5,736,734 A | 4/1998 | Marcus et al. |
| 5,745,684 A | 4/1998 | Oskouy et al. |
| 5,748,766 A | 5/1998 | Maase et al. |
| 5,748,768 A | 5/1998 | Sivers et al. |
| 5,755,748 A | 5/1998 | Borza |
| 5,757,278 A | 5/1998 | Itsumi |
| 5,767,989 A | 6/1998 | Sakaguchi |
| 5,778,089 A | 7/1998 | Borza |
| 5,781,647 A | 7/1998 | Fishbine et al. |
| 5,793,218 A | 8/1998 | Oster et al. |
| 5,801,681 A | 9/1998 | Sayag |
| 5,805,777 A | 9/1998 | Kuchta |
| 5,809,172 A | 9/1998 | Melen |
| 5,812,067 A | 9/1998 | Bergholz et al. |
| 5,815,252 A | 9/1998 | Price-Francis |
| 5,818,956 A | 10/1998 | Tuli |
| 5,822,445 A * | 10/1998 | Wong ................... 356/71 |
| 5,825,005 A | 10/1998 | Behnke |
| 5,825,474 A | 10/1998 | Maase |
| 5,828,773 A | 10/1998 | Setlak et al. |
| 5,832,244 A | 11/1998 | Jolley et al. |
| 5,848,231 A | 12/1998 | Teitelbaum et al. |
| 5,855,433 A | 1/1999 | Velho et al. |
| 5,859,420 A | 1/1999 | Borza |
| 5,859,710 A | 1/1999 | Hannah |
| 5,862,247 A | 1/1999 | Fisun et al. |
| 5,867,802 A | 2/1999 | Borza |
| 5,869,822 A | 2/1999 | Meadows, II et al. |
| 5,872,834 A | 2/1999 | Teitelbaum |
| 5,892,599 A | 4/1999 | Bahuguna |
| 5,900,993 A | 5/1999 | Betensky |
| 5,907,627 A | 5/1999 | Borza |
| 5,920,384 A | 7/1999 | Borza |
| 5,920,640 A | 7/1999 | Salatino et al. |
| 5,928,347 A | 7/1999 | Jones |
| 5,942,761 A | 8/1999 | Tuli |
| 5,946,135 A | 8/1999 | Auerswald et al. |
| 5,960,100 A | 9/1999 | Hargrove |
| 5,973,731 A | 10/1999 | Schwab |
| 5,974,162 A | 10/1999 | Metz et al. |
| 5,987,155 A | 11/1999 | Dunn et al. |
| 5,991,467 A | 11/1999 | Kamiko |
| 5,995,014 A | 11/1999 | DiMaria |
| 5,999,307 A | 12/1999 | Whitehead et al. |
| 6,018,739 A | 1/2000 | McCoy et al. |
| 6,023,522 A | 2/2000 | Draganoff et al. |
| 6,038,332 A * | 3/2000 | Fishbine et al. ............ 382/115 |
| 6,041,372 A | 3/2000 | Hart et al. |
| 6,055,071 A | 4/2000 | Kuwata et al. |
| 6,064,398 A | 5/2000 | Ellenby et al. |
| 6,064,753 A | 5/2000 | Bolle et al. |

| | | | |
|---|---|---|---|
| 6,064,779 A | 5/2000 | Neukermans et al. | |
| 6,072,891 A | 6/2000 | Hamid et al. | |
| 6,075,876 A | 6/2000 | Draganoff | |
| 6,078,265 A | 6/2000 | Bonder et al. | |
| 6,088,585 A | 7/2000 | Schmitt et al. | |
| 6,097,873 A | 8/2000 | Filas et al. | |
| 6,104,809 A | 8/2000 | Berson et al. | |
| 6,115,484 A | 9/2000 | Bowker et al. | |
| 6,122,394 A | 9/2000 | Neukermans et al. | |
| 6,144,408 A | 11/2000 | MacLean | |
| 6,150,665 A | 11/2000 | Suga | |
| 6,154,285 A | 11/2000 | Teng et al. | |
| 6,162,486 A | 12/2000 | Samouilhan et al. | |
| 6,166,787 A | 12/2000 | Akins et al. | |
| 6,178,255 B1 | 1/2001 | Scott et al. | |
| 6,195,447 B1 | 2/2001 | Ross | |
| 6,198,836 B1 | 3/2001 | Hauke | |
| 6,204,331 B1 | 3/2001 | Sullivan et al. | |
| 6,240,200 B1 * | 5/2001 | Wendt et al. | 382/127 |
| 6,259,108 B1 | 7/2001 | Antonelli et al. | |
| 6,272,562 B1 | 8/2001 | Scott et al. | |
| 6,281,931 B1 | 8/2001 | Tsao et al. | |
| 6,327,047 B1 | 12/2001 | Motamed | |
| 6,347,163 B2 | 2/2002 | Roustaei | |
| 6,355,937 B2 | 3/2002 | Antonelli et al. | |
| 6,404,904 B1 * | 6/2002 | Einighammer et al. | 356/71 |
| 6,414,749 B1 * | 7/2002 | Okamoto et al. | 356/71 |
| 6,444,969 B2 * | 9/2002 | Johnson | 382/124 |
| 6,485,981 B1 * | 11/2002 | Fernandez | 436/71 |
| 6,643,390 B1 | 11/2003 | Clark et al. | |
| 6,658,140 B1 * | 12/2003 | Hillmann et al. | 382/127 |
| 2002/0030668 A1 | 3/2002 | Hoshino et al. | |
| 2002/0106115 A1 * | 8/2002 | Rajbenbach et al. | 382/126 |

FOREIGN PATENT DOCUMENTS

| | | | |
|---|---|---|---|
| EP | 0 653 882 A1 | 5/1995 | |
| EP | 0 379 333 B1 | 7/1995 | |
| EP | 0 924 656 A2 | 6/1998 | |
| EP | 0 889 432 A2 A3 | 1/1999 | |
| EP | 0 905 646 A1 | 3/1999 | |
| EP | 0 785 750 B1 | 6/1999 | A61B/5/117 |
| EP | 11-225272 A | 8/1999 | |
| EP | 11-289421 A | 10/1999 | |
| EP | 0 623 890 B1 | 8/2001 | |
| GB | 2 089 545 | 6/1982 | G06K/9/20 |
| GB | 2 313 441 | 11/1997 | G06K/7/10 |
| JP | 62-212892 | 9/1987 | G06K/9/20 |
| JP | 1-205392 | 8/1989 | G06K/9/00 |
| JP | 3-161884 | 7/1991 | G06K/9/00 |
| JP | 3-194674 | 8/1991 | G06K/9/00 |
| JP | 3-194675 | 8/1991 | G06K/9/00 |
| WO | WO 87/02491 A1 | 4/1987 | |
| WO | WO 90/03620 | 4/1990 | G06K/9/20 |
| WO | WO 92/11608 | 7/1992 | G06K/9/00 |
| WO | WO 94/22371 A2 A3 | 10/1994 | |
| WO | WO 96/17480 A2 A3 | 6/1996 | |
| WO | WO 97/29471 A1 | 8/1997 | |
| WO | WO 97/41528 A1 | 11/1997 | |
| WO | WO 98/09246 A1 | 3/1998 | |
| WO | WO 98/12670 A1 | 3/1998 | |
| WO | WO 99/12123 A1 | 3/1999 | |
| WO | WO 99/26187 A1 | 5/1999 | |

OTHER PUBLICATIONS

English–language Abstract of Japanese Patent publication No. 03–194674, from http://www1.ipdl.jpo.go.jp, 2 Pages (Aug. 26, 1991—Date of publication of application).

English–language Abstract of Japanese Patent Publictaion No. 03–194675, from http://www1.ipdl.jpo.go.jp, 2 Pages (Aug. 26, 1991—Date of publication of application).

English–language Abstract of Japanese Patent Publication No. 62–212892, from http://www1.ipdl.jpo.go.jp, 1 Page (Sep. 18, 1987—Date of publication of application).

International Search Report from PCT Appl. No. PCT/US03/01167, 4 Pages, mailed Apr. 10, 2003.

Btt (Biomatic Technology Today), Finger technologies contacts, 2 pages.

Drake, M.D. et al., "Waveguide hologram fingerprint entry device," *Optical Engineering*, vol. 35, No. 9, Sep. 1996, pp. 2499–2505.

Roethenbaugh, G. (ed.), *Biometrics Explained*, 1998, ICSA, pp. 1–34.

*Automated Identification Systems*(Visited May 20, 1999) <http://www.trw.com/dystems/bldgaccess2.html>, 1 page, Copyright 1999.

*Ultra–Scan Corporation Home Page*(visited May 20, 1999) <http:/www.ultra–scan.com/index.htm>, 3 pages. (discusses technology as early as 1996).

*Profile*(last updated Aug. 16, 1998) <http://www.dermalog.de/Britain/Profile/profile.htm>, 3 pages. (discusses technology as early as 1990).

*ID–Card System Technical Specifications*(last updated Jul. 18, 1998) <http://dermalog.de/Britain/Products/ID–Card/idcard2.htm>, 2 pages.

*Fujitsu Limited Products and Services*(updated Apr. 21, 1999) <http://www.fujitsu.co.jp/hypertext/Products/Index-e.html>, 3 pages. Copyright 1995–1999.

*SonyDCam*(visited May 20, 1999) <http://www.microsoft.com/DDK/ddkdocs/Win2k/sonydcam.htm>, 3 pages, Copyright 1999.

*Verid Fingerprint Verification*(visited May 17, 1999) <http://www.tssi.co.uk/products/finger.html>, 2 pages.

*Startek's Fingerprint Verification Products: Fingerguard FG–40*(visited May 18, 1999) <http://www.started.com.tw/product/fg40/fg40.html>, 3 pages.

*SAC Technologies Showcases: Stand–Alone SAC–Remote (®)* (visited May 18, 1999) <http://www.pathfinder.com/money/latest/press/PW/1998Mar 25/1026.html>, 2 pages.

"Biometrics, The Future is Now,", www.securitymagazine.com, May 1999, pp. 25–26.

*Mytec Technologies Gateway*, (visited Apr. 27, 1999) <http://www.mytec.com/Products/gateway/>, 1 page.

*Mytec Technologies Gateway: Features & Benefits*, (visited Apr. 27, 1999) <http:/www.mytec.com/Products/gateway/features.htm>, 1 page.

*Mytec Technologies Touchstone Pro: Features*, (visited Apr. 27, 1999) <http://www.mytec.com/Products/Touchstone/features.htm>, 1 page.

*Electronic Timeclock Systems and Biometric Readers*(last updated Apr. 17, 1999) <http://www.lfs–hr–bene.com/clocks.html>, 1 page.

*Fingerprint Time Clock*(visited May 17, 1999) <http://www.lfs–hr–bene.com/Biometrics/Fingerprintclock.html>, 6 pages.

*KC–901: The KSI fingerprint sensor*(visited May 17, 1999) <http://www.kinetiic.bc.ca/kc–901.html>, 3 pages.

*INTELNET INC.*(visited May 20, 1999) <http://www.intelgate.com/index.html>, 1 page, Copyright 1996.

*Ver–i–Fus Fingerprint Access Control System*(visited May 20, 1999) <http:/www.Intelgate.com/verifus.htm>, 2 pages. (Ver–l–fus product released in 1995).

*Ver–i–fus™Configurations*(visited May 20, 1999) <http://www.Intelgate.com/verconfig.htm>, 1 page. (Ver–i–fus product released in 1995).
*Ver–i–Fus™& Ver–i–Fus^m™*(visited May 20, 1999) <http://www.Intelgate.com/vif_data.htm>, 3 pages. (Ver–i–fus product released in 1995).
*Access Control System Configurations*(visited May 20, 1999) <http://www.intelgate.com/access.htm>, 2 pages. (Ver–i–fus product released in 1995).
*Company*(visited May 17, 1999) <http://www.instalinfo.com.company.htm>, 2 pages.
*TouchLock™// Fingerprint Identity Verification Terminal*(visited May 17, 1999) <http://www.Identix.com/TLock.htm>, 4 pages.
*Physical Security and Staff Tracking Solutions*(visited May 17, 1999) <http://www.Identix.com/products/blosecuirty.html>, 3 pages. Copyright 1996–1998.
*Veriprint2000 Fingerprint Verification Terminal For Use With Jantek Time & Attendance Software*(visited May 17, 1999) <http://www. hunterequipment.com/fingerprint.htm>, 2 pages.
*Veriprint Product Applications*(visited Apr. 27, 1999) <http://www.biometricid.com/uses.htm>, 1 page, Copyright 1999.
*Bill Home Page*(visited Apr. 27, 1999) <http://www.biometricid.com/homepage.htm>, 1 page, Copyright 1999.
*Veriprint 2100 Stand–Alone Fingerprint Verifcation Terminal*(visited Apr. 27, 1999) <http://www.biometricid.com/veriprint2100.htm>, 3 pages.
Randall, N., "A Serial Blue on Speed," *PC Magazine*, May 25, 1999, pp. 201–203.
*The DERMALOG Check–ID*(visited Nov. 12, 1999) <http://www.dermalog.de/ganzneu/products_check.html>, 1 page.
*Check–ID Specifications and Features*(visited Nov. 12, 1999) <http://www.dermalog.de/ganzneu/spec_check.html>, 1 page, Copyright 1999.
*Startek's Fingerprint Verification Products: FingerFile 1050*(visited Oct. 8, 1999) <http://www.startek.com.tw/product/ff1050/ff1050.html>, 3 pages.
*Time Is Money*(visited Jun. 5, 1998) <http://www.iaus.com/afim.htm>, 3 pages.
*LS 1 LiveScan Booking Workstation High Performance Finger & Palm Scanning System*(visited Jun. 4, 1998) <http://www.hbs–jena.com/ls1.htm>, 6 pages, Copyright 1998.
*Welcome to the Homepage of Helmann Biometric Systems GmbH*(visited Jun. 4, 1998) <http://www.hbs–jena.com/>, 1 page, Copyright 1998.
*Heimann Biometric Systems Corporate Overview*(visited Jun. 4, 1998) <http://www.hbs–jena.com/company.htm>, 4 pages, Copyright 1998.
*Remote Access Positive IDentification –raPID*(visited Jun. 3, 1998) <http://www.nec.com/cgl–bin/showproduct.exe?pro...Access +IDentification +%2D+raPID>, 2 pages, Copyright 1997.
*Morpho DigiScan Cellular*(visited Jun. 3, 1998) <http://www.morpho.com/products/law_enforcement/digiscan/cellular.htm>, 2 pages, Copyright 1998.
*A.F.I.S.*(last updated Apr. 2, 1998) <http://www.dermalog.de/afis.htm>, 2 pages.
*Morpho FlexScan Workstation*(visited Jun. 3, 1998) <http://www.morpho.com/products/law_enforcement/flexcan/>, 2 pages, Copyright 1998.

True–ID™The LiveScan with special "ABILITY"...2 PAGES.
Printrak International: User List (visited Jun. 3, 1998) <http://www.printrakinternational.com and links>, 10 pages, Copyright 1996.
Live–Scan Products: Tenprinter® 1133S (visited Apr. 23, 1999) <http://www.digitalblometrics.com/Products/tenprinter.htm>, 4 pages. (Tenprinter 1133S released in 1996).
TouchPrint™ 600 Live–Scan System (visited Nov. 17, 1999) <http://www.identix.com/products.livescan.htm>, 4 pages, Copyright 1996–1998.
Systems for Live–Scan Fingerprinting, Digital Biometrics, Inc., 8 pages, Copyright 1998.
DBI FingerPrinter CMS, Digital Biometrics, Inc., 5 pages. (CMS released in 1998).
Fingerscan V20, Identix Incorporated, 1 page, Copyright 1999.
Verid Fingerprint Reader, TSSI, 4 pages.
Response to Request for Information, Cross Match Technologies, Inc., 13 pages, Apr. 14, 1999.
Startek's Fingerprint Verification Products (visited Nov. 17, 1999) <http://www.startek.com.tw/product/index.html>, 1 page.
Introduction to Startek's Fingerprint Verification Products (visited Nov. 17, 1999) <http://www.startek.com.tw/product/index2.html>, 2 pages.
Automatic Fingerprint Identification Systems (visited Nov. 17, 1999) <http://www.sagem.com/en/produit4–en/empreinte–dig–en.htm>, 1 page.
Digital Biometrics Corporate Information (visited Nov. 17, 1999) <http://www.digitalbiometrics.com/Corporate_info/Corporate_info.htm>, 2 pages. (discusses technology as early as 1985).
DBI Live–Scan Products: Digital Biometrics TEN-PRINTER (visited Nov. 17, 1999) <http://www.digitalbiometrics.com/products/tenprinter.htm>, 4 pages. (Tenprinter released in 1996).
DBI Live–Scan Products: NETWORKING OPTIONS (visited Nov. 17, 1999) <http://www.digitalbiometrics.com/products/networking_options.htm>, 3 pages.
DBI Live–Scan Products: Digital Biometrics FingerPrinter CMS (visited Nov. 17, 1999) <http://www.digitalbiometrics.com/products.FingerPrinterCMS.htm>, 3 pages. (CMS released in 1998).
DBI Live–Scan Products: Image Printer Stations (visited Nov. 17, 1999) <http://www.digitalbiometrics.com/products/imageprinter.htm>, 2 pages.
DBI Live–Scan Products: FC–21 Fingerprint Capture Station (visited Nov. 17, 1999) <http://www.digitalbiometrics.com/products/Fingerprintcapture.htm>, 2 pages.
Series 400 OEM Scanner (visited Nov. 17, 1999) <http://www.ultra–scan.com/400.htm>, 3 pages. (Scanner released in 1996).
USC Scanner Design (visited Nov. 17, 1999) <http://www.ultra–scan.com/scanner.htm>, 4 pages. (Scanner released in 1996).
Series 500/600 Scanners (visited Nov. 17, 1999) <http://www.ultra–scan.com/500.htm>, 3 pages. (Scanner released in 1996).
Series 700 ID Station (visited Nov. 17, 1999) <http://www.ultra–scan.com/700.htm>, 3 pages. (Scanner released in 1998).

Identix: The Corporation (visited Nov. 17, 1999) <http://www.identix.com/corporate/home.htm>, 2 pages, Copyright 1996–1998.

Biometric Imaging Products (visited Nov. 17, 1999) <http://www.identix.com/products/bioimage.htm>, 1 page, Copyright 1996–1998.

TouchPrint™ 600 Live–Scan System (visited Apr. 23, 1999) <http://www.identix.com/products/livescan.htm>, 4 pages, Copyright 1996–1998.

TouchPrint™ 600 Palm Scanner (visited Nov. 17, 1999) <http://www.identix.com/products/palmscan.htm>, 3 pages, Copyright 1996–1998.

TouchPrint™ 600 Card Scan System (visited Nov. 17, 1999) <http://www.identix.com/products/cardscan.htm>, 3 pages, Copyright 1996–1998.

Dermalog Key –The safest and easiet way of access control (Last updated Jul. 18, 1998) <http://www.dermalog.de/Britain/Products/Key/key.htm>, 1 page.

Dermalog Finger–IP Your small size solution for high security (Last updated Jul. 18, 1998) <http://www.dermalog.de/Britain/Products/Finger/fingerid.htm>, 1 page.

Mytec: Corporate (visited Nov. 17, 1999) <http://www.mytec.com/corporate/>, 2 pages.

Kinetic Sciences Inc. Fingerprint Biometrics Division (visited Nov. 17, 1999) <http://www.kinetic.bc.ca/main–FP-B.html>, 1 page.

Fingerprint Biometrics: Securing The Next Generation, May 19, 1999, (visited Nov. 17, 1999) <http://www.secugen.com/pressrel.htm>, 2 pages.

Secugen Unveils Fully Functional Fingerprint Recognition Solutions, May 11, 1999, (visited Nov. 17, 1999) <http://www.secugen.com/pressrel.htm>, 3 pages.

POLLEX Technology Ltd., The Expert in Fingerprint Identification–POLLog (visited Nov. 17, 1999) <http://www.pollex.ch/english.products/pollog.htm>, 2 pages.

Sony Fingerprint Identification Terminal (visited Nov. 17, 1999) <http://www.losoftware.com/blosols/sony/flu/applications/fit100.htm>, 2 pages.

Sony Fingerprint Identification Unit (FIU–700) (visited Nov. 17, 1999) <http://www.losoftware.com/blosols/sony/flu70/index.htm>, 2 pages. (Unit available late 1999).

Sony Fingerprint Identification Unit (visited Nov. 17, 1999) <http://www.losoftware.com/blosols/sony/flu/index.htm>, 3 pages.

Fujitsu Fingerprint Recognition Device (FPI–550) (visited Nov. 17, 1999) <http://www.losoftware.com/biosols/fujitsu/fpi550.htm>, 2 pages.

Mitsubishi MyPass LP–1002 (visited Nov. 17, 1999) <http://www.losoftware.com/biosols/mitsubishi/mypass.htm>, 2 pages.

SecureTouch PV –A Personal "Password Vault" (visited Nov. 17, 1999) <http://www.biometricaccess.com/securetouch_pv.htm>, 1 page.

Digital Descriptor Systems, Inc.–Profile (visited Nov. 17, 1999) <http://www.ddsi.cpc.com/pages/profile.htm>, 3 pages.

Press Release: Printrak International Announces New Portable Fingerprint ID Solution, Dec. 10, 1996, (visited Nov. 17, 1999) <http://www.scott.net/–dg/25.htm>, 3 pages.

Corporate Profile (visited Nov. 17, 1999) <http://www.printrakinternational.com/corporate.htm>, 1 page.

Printrak Products (visited Nov. 17, 1999) <http://www.printrakinternational.com/Products.htm>, 1 page. (Discusses technology as early as 1974).

Verifier™ 200 Fingerprint Capture Devices, Cross Match Technologies, Inc., 2 pages, 1996–1997.

Verifier 200 Direct Fingerprint Reader, Cross Check Corporation, 2 pages, 1996–1997.

Verifier™ 250 Fingerprint Capture Devices, Cross Match Technologies, Inc., 2 pages, 1996–1997.

Verifier 250 Small Footprint Direct Fingerprint Reader, Cross Check Corporation, 2 pages, 1996–1997.

Verifier™ 290 Fingerprint Capture Devices, Cross Match Technologies, Inc., 2 pages, 1996–1997.

Verifier 290 Direct Rolled Fingerprint Reader, Cross Check Corporation, 2 pages, 1996–1997.

Verifier™ 500 Fingerprint Capture Devices, Cross Match Technologies, Inc., 2 pages, 1998.

Biometric terminal, 1 page.

10–Print Imaging System, Cross Check Corporation, 2 pages, 1998.

Cross Match Technologies, Inc., (visited Mar. 25, 1999) <http://www.crossmatch.net/>, 1 page.

Cross Match Technologies, Inc.–Products Overview (visited Mar. 25, 1999) <http://www.crossmatch.net/new/products/product–index.html>, 1 page.

*Cross Match Technologies, Inc. –Law Enforcement Systems* (visited Mar. 25, 1999) <http://www.crossmatch.net/new/law/law–index.html>, 2 pages.

*Cross Match Technologies, Inc. –Commerical Systems: Building On The Standard* (visited Mar. 25, 1999) <http://www.crossmatch.net/new/commerical/commerical–index.html>, 2 pages.

*Cross Match Technologies, Inc. –International Sales* (visited Mar. 25, 1999) <http://www.crossmatch.net/new/sales/sales–index.html>, 1 page.

*Cross Match Technologies, Inc. –Support* (visited Mar. 25, 1999) <http://www.crossmatch.net/new/supposrt/support–index.html>, 1 page.

*Cross Match Technologies, Inc. –News –Press Release – Verifier 400 Press Release* (visited Mar. 25, 1999) <http://www.crossmatch.net/new/news/news–pr–050798.html>, 1 page.

*Global Security Fingerscan™System Overview* (visited Jan. 11, 2000) <http://wwwu–net.com/mbp/sol/g/a9.htm>, 12 pages.

"Command Structure for a Low–Cost (Primitive) Film Scanner," *IBM Technical Disclosure Bulletin,* IBM Corp., vol. 35, No. 7, Dec. 1992, pp. 113–121.

*Fingerprint Scan API Toolkit Version 1.x Feature List* (Apr. 26, 2000) <http://www.mentalix.com/api/archive_fapivi.html>, 3 pages.

Kunzman, Adam J. and Wetzel, Alan T., "1394 High Performance Serial Bus: The Digital Interface for ATV," *IEEE Transaction on Consumer Electronics,* IEEE, vol. 41, No. 3, Aug. 1995, pp. 893–900.

*Mentalix Provides The First IAFIS–Certified Latent Print Scanning Solution for Windows® (Jul. 23, 1999) <http://www.mentalix.com/pressreleases/fprintplook3_prei.htm>,* 2 pages.

Slujis, F. et al., "An On–chip USB–powered Three–Phase Up/down DC/DC Converter in a Standard 3.3V CMOS Process," *2000 IEEE International Solid–State Circuits Conference,* IEEE, Feb. 9, 2000, pp. 440–441.

Venot, A. et al., "Automated Comparison of Scintigraphic Images," *Journal of Nuclear Medicine,* vol. 27, No. 8, Aug. 1986, pp. 1337–1342.

English-language Abstract for Japanese Patent Publication No. 59-103474, published Jun. 14, 1984, printed from espacenet.com, 1 page.

English-language Abstract for Japanese Patent Publication No. 10-262071, published Sep. 29, 1998, printed from espacenet.com, 1 page.

English-language Abstract for Japanese Patent Publication No. 11-167630, published Jun. 22, 1999, printed from espacenet.com, 1 page.

English-language Abstract for Japanese Patent Publication No. 11-225272, published Aug. 17, 1999, printed from espacenet.com, 1 page.

English-language Abstract for Japanese Patent Publication No. 11-252489, published Sep. 17, 1999, printed from espacenet.com, 1 page.

English-language Abstract for Japanese Patent Publication No. 11-289421, published Oct. 19, 1999, printed from espacenet.com, 1 page.

English-language Abstract for Japanese Patent Publication No. 10-079017, published Mar. 24, 1998, printed from espacenet.com, 1 page.

* cited by examiner

COLL ONLY

DIFF ONLY

INVENTION HYBRID ILLUM.

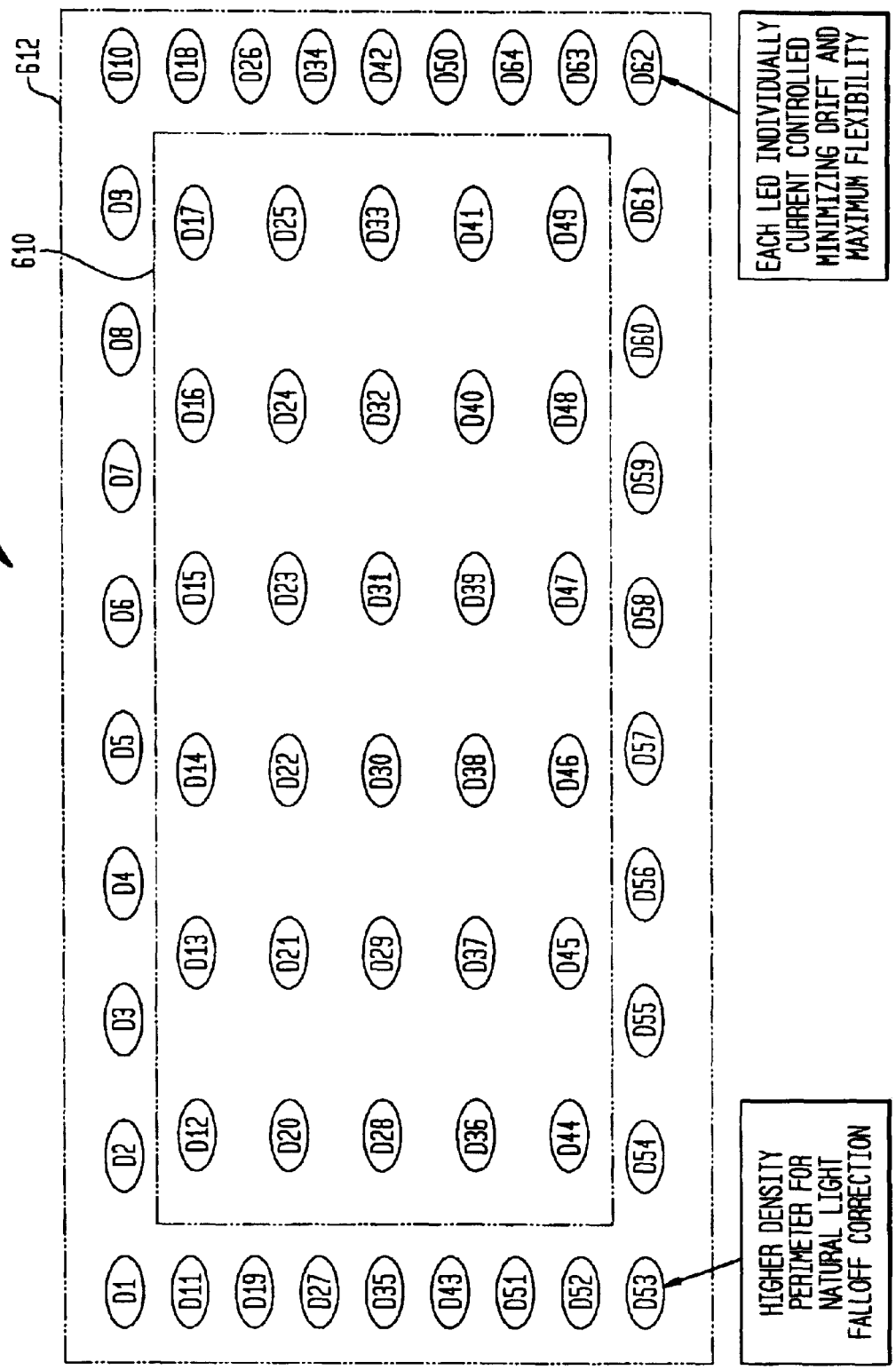

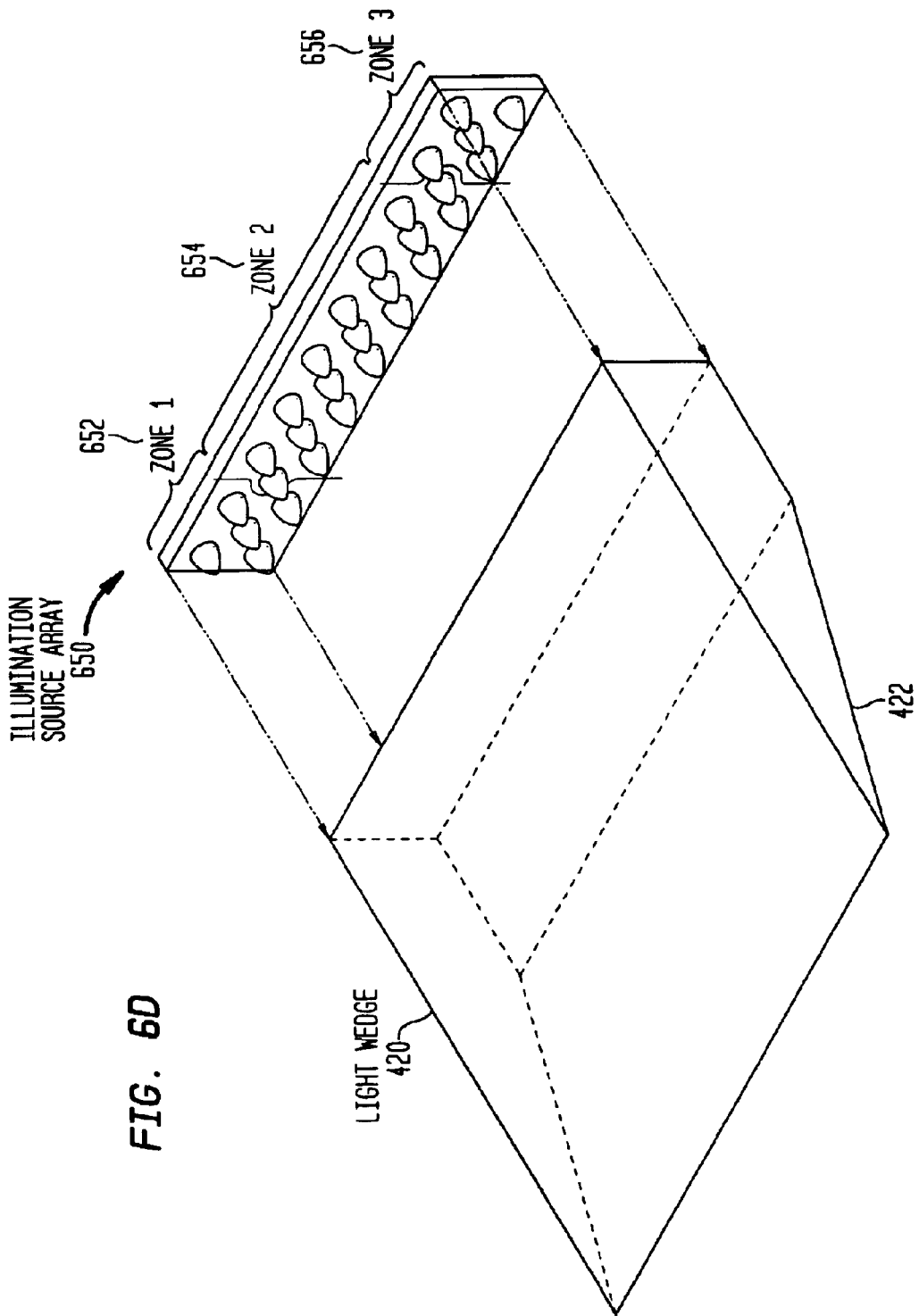

SYSTEMS AND METHODS FOR ILLUMINATING A PLATEN IN A PRINT SCANNER

BACKGROUND OF THE INVENTION

1. Field of the Invention

The present invention pertains to biometric imaging technology, and in particular, to live scanning of fingerprints and/or palm prints.

2. Background Art

Biometric imaging systems may include, but are not limited to, fingerprint imaging systems and palm print imaging systems. Such print imaging systems are also referred to as scanners or live scanners. Conventional live scanners use light to detect an image of a fingerprint and/or palm print. One or more fingers or palms are placed on a platen. An illumination source illuminates the underside of the platen. An image representative of valleys, ridges, or other characteristics of a fingerprint or a palm print is then detected by an image sensor, such as, a solid-state camera.

The illumination source must have sufficient power so that a high quality image representative of a print is detected by the image sensor. Often the optical system employed in a print scanner is telecentric which further increases the power required at the illumination source. In a telecentric system an aperture is used to limit light passing through the optical system. In this way, only light rays traveling within a range of angles at or near a direction along an optical axis are detected. Such telecentricity improves the image quality and reduces blurring, but has a drawback in that increased power is required at the illumination source to ensure that sufficient light passes through the aperture of the optical system to the image sensor.

Collimated light has been used in an illumination source for a print scanner to reduce the power required. A collimated lens collimates incoming light rays so that collimated light rays exit which travel parallel to one another. Because the rays are made parallel they travel efficiently through a telecentric optical system. FIG. 1A shows an example of a collimated light source lighting technique. A single discrete light source 110 emits light over an area as indicated by example rays 112. The actual emission area depends upon the type of emitter and other factors such as whether a lens, light guide or other optical element is provided to focus or guide the emitted light. A subset 115 of rays 112 are collimated by collimating lens 120 and emerge as parallel rays 125. The subset rays 115 are those rays within an angular range A at the focal point of collimating lens 120 as shown in FIG. 1A.

Collimated illumination source lighting techniques provide a relatively efficient, low power source especially in a telecentric optical system, but lack sufficient good grey scale shading for uses in high-quality fingerprint and/or palm print scanners. FIG. 1B shows an example conventional fingerprint or palm print scanner using collimated illumination in a telecentric optical system. A single discrete light source 110 emits red light which is collimated by collimating lens 120 before illuminating a prism 130. In this case, a top surface of prism 130 serves as a platen. The collimated light illuminates the underside of prism 130. When one or more fingers or palms are placed on prism 130, an image representative of valleys, ridges, and other characteristics of a fingerprint or a palm print is then focused by imaging lens 140 to aperture 150, and then further focused by imaging lens 160 to a focal plane/sensor plane 170. One or more image sensors, such as, solid-state cameras (CCD or CMOS cameras) detect the image. The use of collimated light improves the efficiency in which light travels through the telecentric optical system from the collimating lens 120 to the prism 130 and eventually through aperture 150 to an image sensor at focal plane/sensor plane 170.

While the collimated light is efficient, such illumination can produce print images having limited or no grey scale shading because the light rays incident on a platen are generally parallel. Such parallel rays are then either reflected or absorbed by a biometric object, such as, a finger or palm ridge. This tends to create a high contrast print having essentially black and white values only and no grey shade values. Such high contrast prints (also called binary prints) do not provide the full spectrum of grey shades required for many applications such as, forensics, law enforcement, security, and anti-terrorism. This can result in unacceptable images being captured especially in cases where significant pressure is placed on a finger or palm during the live scan.

As an alternative to collimated lighting techniques, print scanners have used diffuse source lighting. Diffuse light includes rays traveling in many different directions which tends to provide a flat, uniform illumination with good fill. In a print scanner, such diffuse light allows good grey scale shades to be detected since light traveling in a number of different directions is incident on a platen. One disadvantage is the illumination power required is high, especially in a print scanner having a telecentric optical system. The high power required means more light sources need to be used which, among other things, increases cost and the amount of heat generated.

FIG. 2 shows an example print scanner using a diffuse light source 205 that illuminates prism 130. Diffuse light source 205 includes a discrete emitter array 210 and a diffuser 220. Discrete emitter array 210 is made up a number of evenly spaced light emitting diodes that emit red light. As shown schematically in FIG. 2, diffuse light source 205 is an inefficient light source for generating an image and passing the image to an image sensor in a telecentric system. Diffuse light travels randomly or in different directions and is not transmitted through an entire telecentric system. For instance, much of the light is blocked by aperture 150. Such inefficiency in illumination of a print scanner is undesirable as it increases the number of emitters needed in array 210 and the power requirements of array 210. This problem is even more acute for telecentric print scanners where flat, uniform illumination is needed across a relatively large platen, such as, a platen big enough to allow capture of images for a roll print or slap print of one or more fingers, or a palm print.

In sum, the above drawbacks of using either collimation or diffuse illumination approaches in a print scanner need to be overcome. Other needs also exist in print scanner illumination. These needs include: a need for improved diffuse illumination of a print scanner, a need for providing a greater dynamic range of grey shading output from a camera, and a need for providing more uniform illumination from an illumination source array with flexible control.

BRIEF SUMMARY OF THE INVENTION

The present invention provides systems and methods for illuminating a platen. The present invention, among other things, overcomes the above drawbacks and meets the above needs. Four techniques for improving print scanner illumination are provided. The first technique involves hybrid illumination systems and methods that use both diffusion and collimation. The second technique involves diffuse light illumination systems and methods that use a light wedge. The third technique involves use of a non-uniform illumination source array and use of independent and/or zone controlled light sources. The fourth technique involves use of blue/green light. Each of these techniques can be used alone or in different combinations as described herein with respect to embodiments of the present invention.

According to one embodiment of the present invention, a hybrid illumination system provides illumination to a platen in a print scanner. The hybrid illumination system uses both diffusion and collimation to efficiently provide a flat, uniform illumination at a platen. An illumination source array emits light from a plurality of discrete light sources. One or more diffusers are disposed between the illumination source array and a collimating lens. At least part of the light emitted from the plurality of discrete light sources passes through at least one diffuser and then through a collimating lens. Each diffuser serves to randomize light so that a flat, uniform illumination is obtained at the platen. The individual cones of light initially emitted from the discrete sources are no longer visible. The collimating lens increases the efficiency of the illumination system and reduces the power requirements of the illumination source array. Fewer light sources are needed. This efficiency is especially advantageous in a telecentric optical system of a print scanner.

In one embodiment, the hybrid illumination system has one diffuser. The diffuser is provided near the collimating lens. Alternatively, the diffuser can be provided near the illumination source array or at any other location between the illumination source array and collimating lens depending upon a particular design.

In another embodiment, the hybrid illumination system has two diffusers. One diffuser is provided near the illumination source array and the other diffuser is provided near the collimating lens. In one example, two holographic diffusers are used. In another example, a holographic diffuser is provided near the collimating lens while a cheaper glass or plastic diffuser is provided near the illumination source array. In still another example, a glass or plastic diffuser is provided near the collimating lens and a glass or plastic diffuser is provided near the illumination source array.

The examples are illustrative and not intended to limit the present invention. Any type of diffuser can be used including, but not limited to, a glass type diffuser, plastic type diffuser, or a holographic diffuser. In general, holographic diffusers are more efficient but are also more expensive than glass or plastic diffusers.

According to a further embodiment, an illumination system is provided which uses diffuse light to illuminate a platen in a print scanner. The illumination system has an illumination source array and a light wedge. The light wedge reflects light internally which makes the illumination even more diffuse. The light wedge has one end surface that receives light emitted from the illumination source array. The light wedge also has a reflective surface that reflects light out of the light wedge toward the platen. The reflective surface can be any type of reflective surface. In one example, a reflective layer of paint such as white, gold or silver paint is applied to the wedge surface. According to a further feature, the wedge reflective surface is roughened and a reflective paint layer is applied. Light incident on the wedge is diffuse, reflective surface is then made even more diffuse. In one embodiment, a diffuser is also provided near the light wedge such that light passes out from the light wedge to the diffuser before illuminating the platen.

According to a further feature of the present invention, an illumination source array is made up of a plurality of sources divided into at least a center region and a perimeter region. The density of sources provided in the perimeter region is greater than in the center region to correct for natural light falloff in the illumination system. In another embodiment, the illumination source array is made up of a plurality of sources divided into at least a center region, one or more intermediate regions, and a perimeter region. The density of each region is progressively higher toward the perimeter to correct for natural light falloff in the illumination system. The density of sources provided in the perimeter region is greatest and the density of sources provided in the center region is least. The density of sources provided in each intermediate region is in between that of the perimeter and center regions.

According to a further feature of the present invention, the intensity of each source of an illumination source array can be independently controlled relative to other sources. For example, each source can be a light emitting diode which is individually current controlled to correct for or minimize drift and to ensure a flat, uniform illumination is provided to a platen.

According to a further feature of the present invention, the illumination source array is divided into zones. In one embodiment, a plurality of sources are divided into at least three groups in at least three respective zones. The intensity of each group of sources is independently controlled relative to other groups such that a flat, uniform illumination is provided to the platen. Use of such zones simplifies control while still retaining sufficient flexibility to adjust the relative intensity of the light source groups to ensure flat, uniform illumination is provided to a platen.

According to a further feature of the present invention, an illumination source array comprises a plurality of sources that emit blue/green light. In one preferred example, the blue/green light is equal to or approximately equal to 510 nm. A method includes the steps of emitting blue/green light from a plurality of discrete sources, and illuminating a platen with at least part of the emitted blue/green light. Compared to conventional red light operating at 650 nm, the inventors found that blue/green light increases the dynamic range of grey scale shading in an image of a print of a finger or palm detected with a print scanner.

According to another embodiment, a method provides flat, uniform illumination efficiently to a platen. The method includes the steps of emitting light from a plurality of discrete sources, randomizing the emitted light to obtain diffuse light, collimating at least part of the diffuse light, and illuminating the platen such that an image of a print of a finger or palm placed on the platen can be obtained. The randomizing step can include passing the emitted light through at least one diffuser or through a light wedge. In one example, the emitting step includes emitting blue/green light.

Prior to the emitting step, an arranging step includes arranging the plurality of discrete sources into at least a center region and a perimeter region wherein the density of sources provided in the perimeter region is greater than in the center region. Another step which can be performed is independently controlling the intensity of each source relative to other sources such that a flat, uniform illumination is provided to the platen.

According to a further embodiment, a system for providing flat, uniform illumination efficiently to a platen includes means for emitting light, means for randomizing at least part of the emitted light to obtain diffuse light, and means for collimating at least part of the diffuse light. In this way, a portion of the diffuse light is collimated and falls on the platen as collimated light, while remaining diffuse light falls on the platen as diffuse light. The platen is illuminated with this collimated, diffuse light such that a high contrast image of a print of a finger or palm placed on the platen is obtained.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention. In the drawings:

FIGS. 6A, 6B, and 6C illustrate embodiments of a non-uniform illumination source array according to a further feature of the present invention.

FIG. 6D illustrates an embodiment of a diffuse illumination system having a zone-controlled nonuniform illumination source array and a light wedge according to an embodiment of the present invention.

Figure 1A:
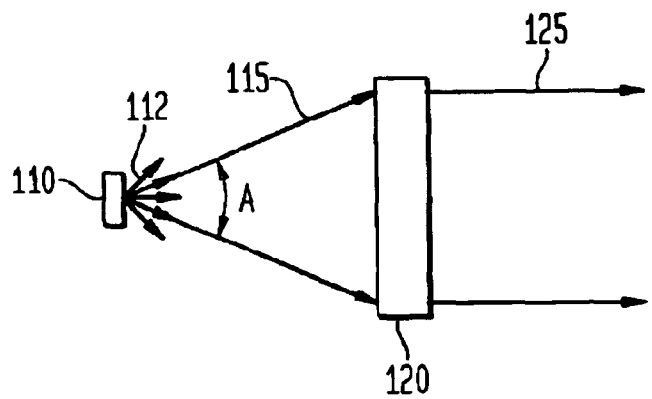
FIG. 1A shows an example of a conventional collimated light source lighting technique.
Figure 1B:
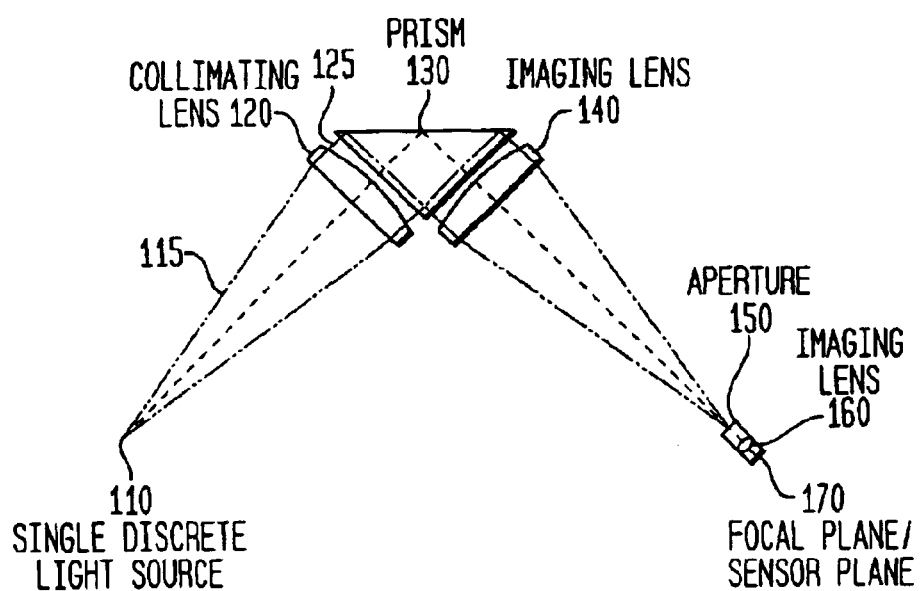
FIG. 1B is a diagram of a conventional fingerprint scanner having a collimated illumination system.
Figure 2:
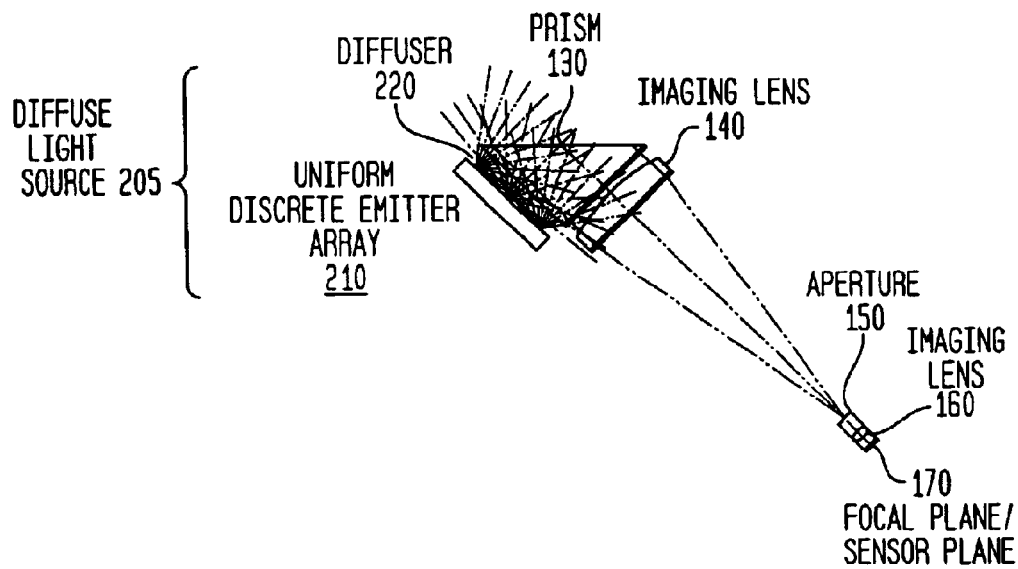
FIG. 2 is a diagram of a conventional fingerprint scanner having a diffuse illumination system.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

TABLE OF CONTENTS

1. Overview
2. Terminology
3. Hybrid Collimated/Diffuse Illumination System
4. Illumination System Having a Light Wedge
5. Non-Uniform Illumination Source and Control
6. Blue/Green Illumination
7. Conclusion While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

1. Overview

The present invention provides illumination for any type of print scanner, including, but not limited to, any type of fingerprint and/or palm print scanner.

2. Terminology

To more clearly delineate the present invention, an effort is made throughout the specification to adhere to the following term definitions consistently.

The term "finger" refers to any digit on a hand including, but not limited to, a thumb, an index finger, middle finger, ring finger, or a pinky finger.

The term "live scan" refers to a scan of any type of fingerprint and/or palm print image made by a print scanner. A live scan can include, but is not limited to, a scan of a finger, a finger roll, a flat finger, slap print of four fingers, thumb print, palm print, or a combination of fingers, such as, sets of fingers and/or thumbs from one or more hands or one or more palms disposed on a platen.

In a live scan, one or more fingers or palms from either a left hand or a right hand or both hands are placed on a platen of a scanner. Different types of print images are detected depending upon a particular application. For example, a flat print consists of a fingerprint image of a digit (finger or thumb) pressed flat against the platen. A roll print consists of an image of a digit (finger or thumb) made while the digit (finger or thumb) is rolled from one side of the digit to another side of the digit over the surface of the platen. A slap print consists of an image of four flat fingers pressed flat against the platen. A palm print involves pressing all or part of a palm upon the platen. A platen can be movable or stationary depending upon the particular type of scanner and the type of print being captured by the scanner.

The terms "biometric imaging system", "scanner", "live scanner", "live print scanner", "fingerprint scanner" and "print scanner" are used interchangeably, and refer to any type of scanner which can obtain an image of all or part of one or more fingers and/or palm in a live scan. The obtained images can be combined in any format including, but not limited to, an FBI, state, or international tenprint format.

The term "platen" refers to a component that includes an imaging surface upon which at least one finger is placed during a live scan. A platen can include, but is not limited to, a surface of an optical prism, set of prisms, or set of micro-prisms, or a surface of a silicone layer or other element disposed in optical contact with a surface of an optical prism, set of prisms, or set of micro-prisms.

The term "collimated, diffuse light" refers to light having rays which have passed through at least one diffuser and a collimating lens. Such collimated, diffuse light can include, but is not limited to, first and second portions wherein the first portion of collimated, diffuse light falls on a platen as collimated light and a second portion of collimated, diffuse light falls on the platen as diffuse light.

3. Hybrid Collimated/Diffuse Illumination System

Figure 3A:
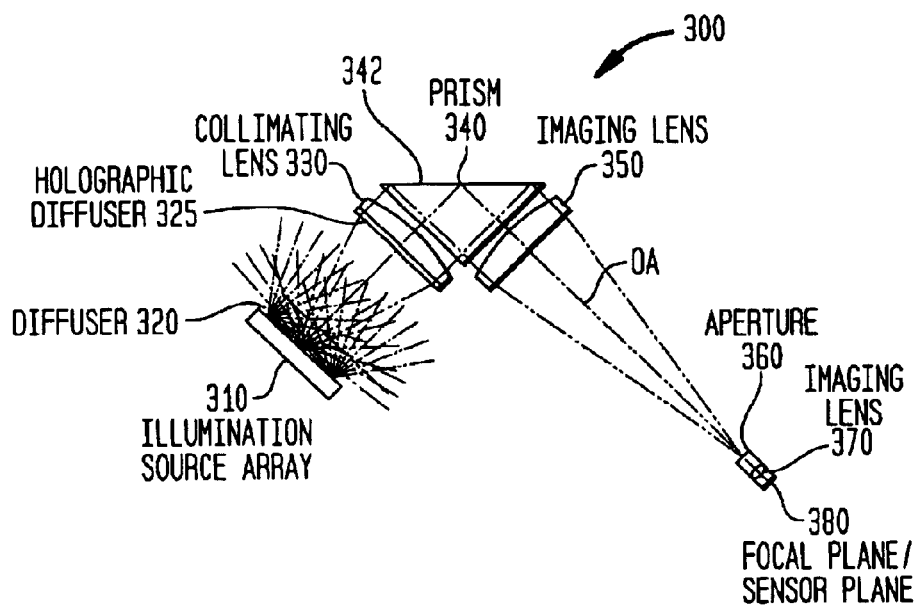
FIG. 3A is a diagram of a print scanner having a hybrid collimated/diffuse illumination system according to an embodiment of the present invention.

FIG. 3A is a diagram of a live print scanner 300 having a hybrid collimated/diffuse illumination system 302 according to an embodiment of the present invention. Live print scanner 300 detects images of a finger and/or palm placed on a platen. A platen is any surface on which a finger or palm is placed in print scanner 300. In the embodiment shown in FIG. 3A, the platen 342 is the top surface of prism 340 or any other surface that receives illumination from the top of the prism 340. For example, platen 342 can be a silicone layer or other protective layer or element provided on top of or in optical contact with prism 340.

Light from hybrid collimated/diffuse illumination system 302 illuminates platen 342. When a finger is placed on platen 342, an image representative of a fingerprint is then reflected from platen 342 through prism 340 for subsequent detection by one or more cameras. In one example, light reflects from platen 342, exits prism 340, and is focused by imaging lens 350 along an optical axis OA to an aperture 360. Light then passes from aperture 360 to an imaging lens 370 for detection at a focal plane/sensor plane 380. One or more cameras (not shown) can be disposed at focal plane/sensor plane 380 to detect and capture the image of a print. This illumination is described further below with respect to FIG. 3B.

As shown in FIG. 3A, hybrid collimated/diffuse illumination system 302 includes an illumination source array 310, a diffuser 320, a holographic diffuser 325, and a collimating lens 330 disposed along an optical axis. Illumination source array 310 can be any area light source including, but not limited to, an array of discrete light emitters, such as, light emitting diodes (LEDs). In one embodiment, the illumination source array 310 comprises an array of emitters which are evenly spaced. In another embodiment, according to a further feature of the invention, illumination source array 310 comprises an array of emitters which are not spaced uniformly. For example, illumination source array 310 can be a non-uniform illumination source array as described with respect to FIGS. 6A–6D below according to a further feature of the invention.

Illumination source array 310 can emit light at a single wavelength or narrowband range of wavelengths, such as infrared, visible, and/or ultraviolet wavelengths. According to one further feature of the invention, illumination source array 310 emits light having a blue/green wavelength ("blue/green light") as described further below with respect to an embodiment in FIGS. 7 and 8.

At least part of the light from illumination source array 310 passes through diffuser 320 and holographic diffuser 325 to collimating lens 330. Diffuser 320 and holographic diffuser 325 each act to diffuse light emitted from the different individual emitter sources in an array 310. In this way, uniform diffuse illumination is input to collimating lens 330. A portion of the diffuse light is then collimated by collimating lens 330 and passes along the optical axis to prism 340 and platen 342. The remaining diffuse light passed from collimating lens 330 falls on the platen as diffuse light.

Several advantages are achieved by a hybrid diffuse/collimated illumination system according to the present invention. The first portion of the diffuse light collimated by collimating lens 330 which passes along the optical axis to prism 340 and platen 342 is efficiently transmitted from collimating lens 330 through aperture 360 to focal plane/sensor plane 380. The presence of collimating lens 330 achieves a more efficient transfer of optical power through a telecentric print scanner than a diffuse only light source, and reduces the power requirements which are needed at illumination source array 310 by approximately two-thirds. The remaining diffuse light passed from collimating lens 330 falls on the platen as diffuse light. Such diffuse light acts as fill light and allows grey scale shading of a print to be detected by an image sensor.

Figure 3B:
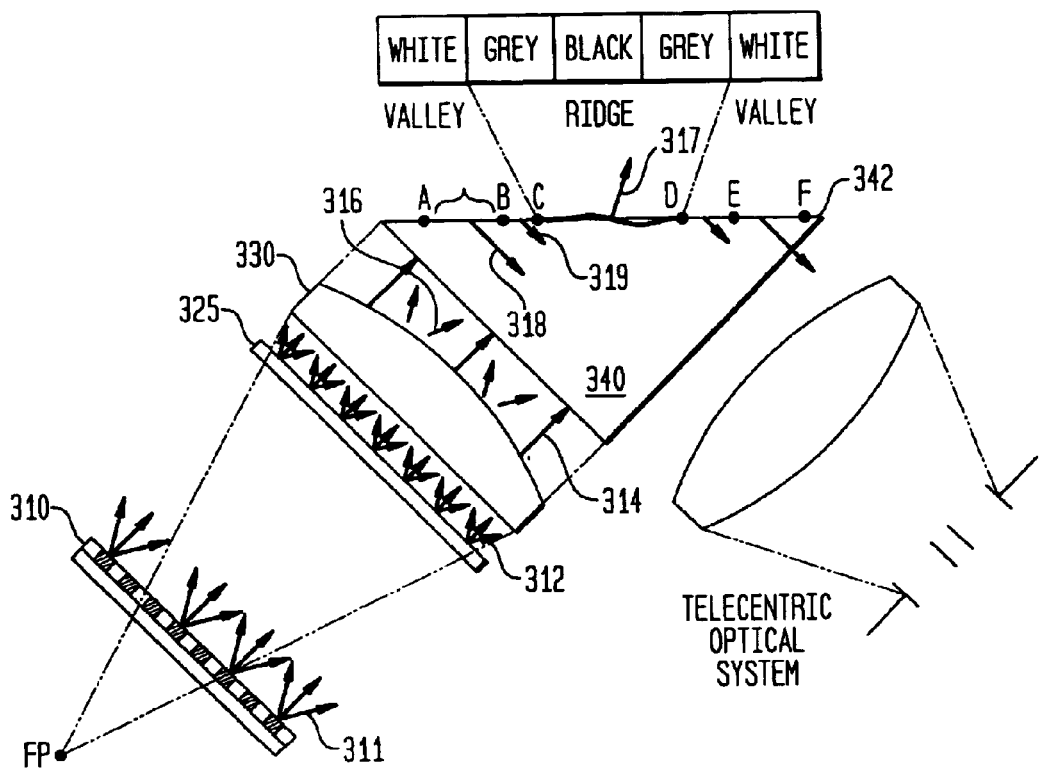
FIG. 3B is a diagram that illustrates detection of grey scale shading with a print scanner having a hybrid collimated/diffuse illumination system according to an embodiment of the present invention.

FIG. 3B illustrates how such advantages are achieved in the operation of a hybrid diffuse/collimated illumination system according to the present invention. Illumination source array 310 is placed at a distance equal to or less than the focal length of collimating lens 330. In FIG. 3B, array 310 is shown between a focal point FP of the collimating lens 330 and the lens 330 itself. At least a part (or portion) of the light emitted by illumination source array 310 will pass through diffuser 320 (not shown) and diffuser 325. Each diffuser 302, 325 acts to randomize the light so that rays travel in many different directions. Only a few rays 311, 312 of the diffuse light are actually shown in FIG. 3B for clarity. Collimating lens 330 receives all or part of the diffuse light rays 312 from diffuser 325. A first portion of the diffuse light indicated by rays 314 is collimated by collimating lens 330 and sent in parallel toward prism 340. This first portion of rays 314 generally corresponds to that portion of rays 312 traveling as if they originated within a cone at focal point FP. The remaining portion of diffuse light indicated by rays 316 that passes through collimating lens 330 falls on the platen as diffuse light. Such diffuse light acts as fill light and allows grey scale shading of a print to be detected by an image sensor.

FIG. 3B further illustrates how a grey scale shaded image of a finger or palm illuminated by rays 314, 316 is obtained. Only one ridge between two valleys is illustrated and enlarged for clarity. The figure is illustrative and is not an actual ray trace drawn to scale. The total illumination (that is rays 314, 316) incident upon platen 342 arrives from a number of different directions. Ridges act to absorb rays at certain incident angles, while valleys act to reflect rays at certain incident angles. The actual angles at which absorption or reflection occurs depends upon, among other things, the indices of refraction of the ridge, the air at the valley, and the prism and platen. In addition, for some incident angles, diffuse light that falls on the platen surface passes through the platen surface and illuminates a valley. Light reflected from the skin of a ridge at the proper angle, then re-enters the prism and is transmitted to the sensor plane. This light enhances the grey scale range and provides a more desirable image.

Reflected rays 318 at valley regions are detected as "WHITE" regions by an image sensor (shown as regions between points A and B and E and F in FIG. 3B). Ridge regions where no rays are reflected are detected as "Black" regions (shown as a region between points C and D in FIG. 3B). Because of the hybrid illumination of the present invention, reflected rays 319 at regions at the edge of a ridge are also detected as "GREY" regions with good grey scale shading (shown as regions between points B and C and D and E in FIG. 3B).

In one implementation used with a palm print scanner having a platen approximately 4 inches by 5 inches, an illumination source array 310 can be powered by 30 Watts (compared to 100 Watts if diffuse light only were used) and still provide adequate illumination power. The use of diffuser 320 and holographic diffuser 325 randomizes the light emitted from illumination source array 310 so that cones of light from the discrete emitters are no longer distinguishable, a more uniform illumination area is provided, and the diffuse component of the total illumination allows grey scale shading to be detected in the image.

Figure 3C:
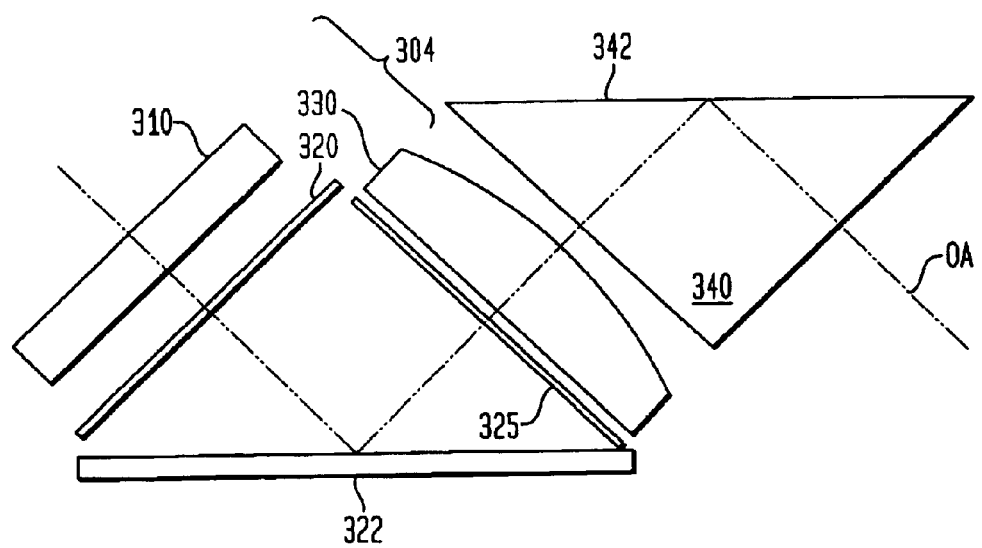
FIG. 3C is a diagram that illustrates a hybrid collimated/diffuse illumination system according to another embodiment of the present invention.

FIG. 3C shows a hybrid collimated/diffuse illumination system 304 according to a further embodiment of the present invention. Hybrid collimated/diffuse illumination system 304 includes an illumination source array 310, diffuser 320, mirror 322, holographic diffuser 325 and collimating lens 330. The presence of mirror 322 provides a more compact arrangement for the hybrid collimated/diffuse illumination system 304. Light travels along an optical axis from illumination source 310 through diffuser 320 to mirror 322. Mirror 322 then reflects the light along the optical axis to holographic diffuser 325. A portion of the diffuse light is then collimated by collimating lens 330 and passes along the optical axis to prism 340 and platen 342, while the remaining diffuse light passes through collimating lens 330 and falls on the platen as diffuse light.

Hybrid collimated/diffuse illumination systems 302, 304 are illustrative and not intended to limit the present invention. Diffuser 320 can be any type of diffuser (e.g., glass, plastic, or holographic). Similarly, diffuser 325 can be any type of diffuser including, but not limited to, a holographic type of diffuser. In one implementation shown in FIGS. 3A–3C, a holographic diffuser 325 is used because it is very efficient, and a glass or plastic diffuser 320 is used because it is less expensive.

In general, one or more diffusers of any type may be used in hybrid collimated/diffuse illumination systems 302, 304 according to the present invention. Accordingly, diffuser 320 or diffuser 325 may be omitted or additional diffusers may be added. Diffuser 320 has an advantage in that it is located at or near the array of discrete emitter sources thereby making the illumination more uniform near the illumination source. Diffuser 325 is provided near the collimating lens 330 to further ensure that uniform illumination is input to collimating lens 330. Collimating lens 330 is provided near prism 340 to ensure at least part of the diffuse light is collimated and efficiently passed to prism 340 and through to focal plane/sensor plane 380. These locations are illustrative. Diffuser 320 and/or diffuser 325 and collimating lens 330 may each be located at different relative locations depending on a particular application or configuration.

Hybrid collimated/diffuse illumination systems 302, 304 can be used with any type of optical fingerprint and/or palm print scanner including, but not limited to, a single finger scanner, multiple finger scanner, palm print scanner, rolled finger print scanner, and/or a slap fingerprint scanner.

4. Illumination System having a Light Wedge

Figure 4:
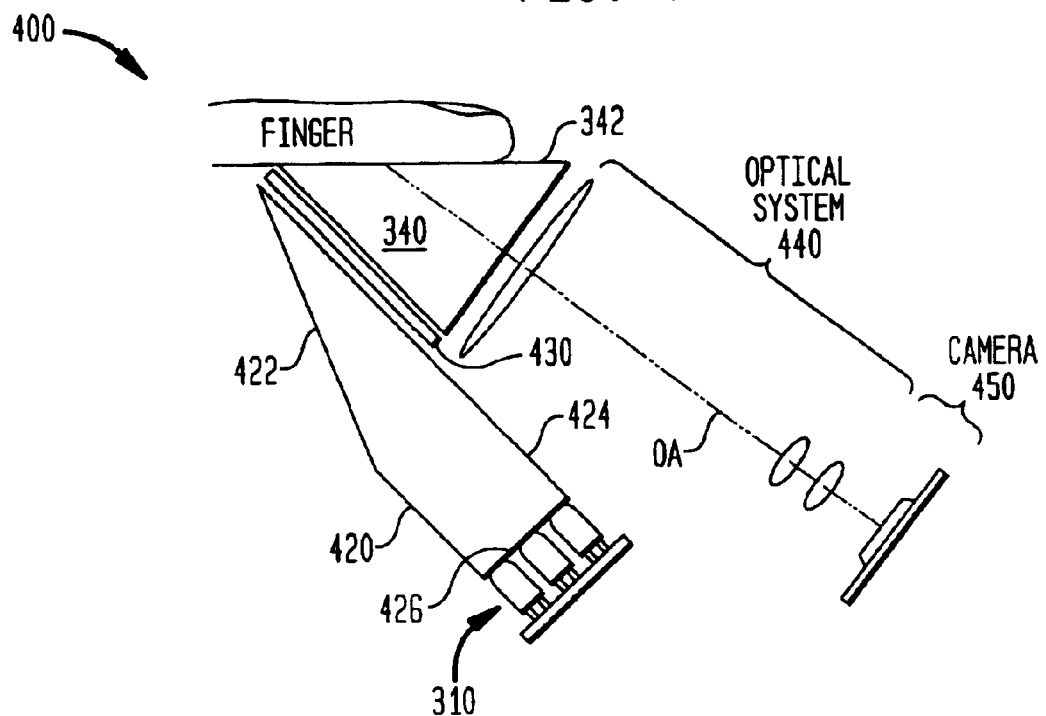
FIG. 4 is a diagram of an illumination system that includes a light wedge and diffuse optical elements according to an embodiment of the present invention.
Figure 5:
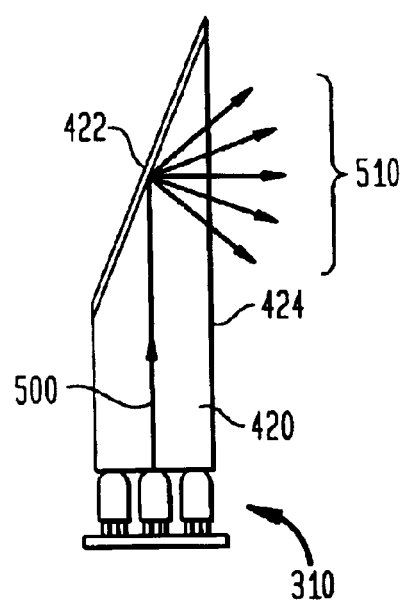
FIG. 5 is a diagram that illustrates diffuse light rays reflected from a surface of a light wedge in the illumination system of FIG. 4.

FIGS. 4 and 5 illustrate a further embodiment of the present invention. FIG. 4 is a diagram of an illumination system 400 in a print scanner having a light wedge 420. An illumination source array 310 inputs light at a end region 426 of light wedge 420. Light is internally reflected within light wedge 420 and passes to a reflector/diffuser surface 422. Reflector/diffuser surface 422 is one angled face or surface of light wedge 420. Preferably, surface 422 is provided at an angle with respect to the optical axis along which light is emitted by illumination source 310. In one embodiment, reflector/diffuse surface 422 acts to both reflect light and make the reflected light more diffuse. As shown in FIG. 5, light rays 500 emitted by illumination source 310 pass through light wedge 420 to impinge on reflector/diffuser surface 422. Diffuse, reflected rays 510 then pass from surface 422 out through the surface 424 of light wedge 420. For clarity, other ray paths illustrating the internal reflection of light within light wedge 420 are omitted. This internal reflection within light wedge 420 provides a further advantage, however, as it tends to make the light even more diffuse and improve grey scale shading.

As shown in FIG. 4, light passing from surface 424 or light wedge 420 then passes to diffuser 430. Diffuser 430 makes the light even more diffuse so that uniform illumination is provided to platen 342. When a finger is placed on platen 342 as shown in FIG. 4, an image of the finger is then sent through optical system 440 to camera system 450 for detection and processing. Optical system 440 can be any conventional optical system in a print scanner. Similarly, camera system 450 can be any type of camera including, but not limited to, one or more CCD or CMOS cameras.

In one embodiment, reflector/diffuser surface 422 is a layer of highly reflecting white paint applied to the surface of a glass light wedge 420. The white paint acts as a first diffuser seen by the illumination light source array 310. This diffuser acts to remove at least part of the illumination structure caused by the one or more cones of light emitted by the light source array 310. The second diffuser 430 acts to remove more or all of the remaining illumination structure such that a uniform illumination is passed to prism 340.

An illumination system having a light wedge according to the present invention can be used with any type of illumination light source in any type of print scanner. For instance, illumination system 400 having a light wedge 420 can be used with any type of optical fingerprint and/or palm print scanner including, but not limited to, a single finger scanner, multiple finger scanner, palm print scanner, rolled finger print scanner, and/or a slap fingerprint scanner. As described above, illumination source array 310 can be any area light source including, but not limited to, an array of discrete light emitters, such as, light emitting diodes (LEDs) or laser diodes. In one embodiment, the illumination source array 310 comprises an array of emitters which are evenly spaced. In another embodiment, according to a further feature of the invention, illumination source array 310 comprises an array of emitters which are not spaced uniformly. For example, illumination source array 310 can be a non-uniform illumination source array as described with respect to FIGS. 6A–6D below according to a further feature of the invention.

Illumination source array 310 can emit light at a single wavelength or narrowband range of wavelengths, such as infrared and/or visible wavelengths. According to one further feature of the invention, illumination source array 310 emits light having a blue/green wavelength ("blue/green light") as described further below with respect to an embodiment in FIGS. 7 and 8.

5. Non-Uniform Illumination Source and Control

Figure 6A:
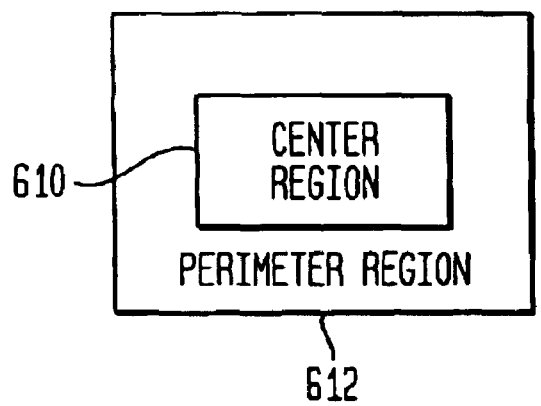

FIGS. 6A, 6B, 6C, and 6D are diagrams of a non-uniform illumination source array according to a further feature of the present invention. As shown in FIG. 6A, non-uniform illumination source array 600 includes a center region 610 and perimeter region 612. Non-uniform illumination source array 600 is made up of a plurality of discrete emitters such as light emitting diodes (LEDs). Center region 610 is an area where the density of emitters is lower than the density of emitters in the perimeter region 612. In this way, non-uniform illumination source array 600 has an advantage in that natural light falloff that occurs in a perimeter region of a telecentric imaging system is corrected by the relatively higher density of emitters arranged in the perimeter region 612. In addition, according to a further feature, each emitter can be individually controlled to correct for or minimize drift and maximize flexibility. This individual control and flexibility further enables a designer of a print scanner to make sure that uniform, flat illumination is provided across a platen.

FIG. 6B shows one example according to the present invention. In this example, non-uniform illumination source array 600 consists of an array of 64 LEDs (D1–D64). Center region 610 is made up of 30 LEDs (D12–D17, D20–D25, D28–D33, D36–D41, and D44–D49). Perimeter region 612 consists of LEDs D1∝D11, D18–D19, D26–D27, D34–D35, D42–D43, and D50–D64.

Figure 6C:
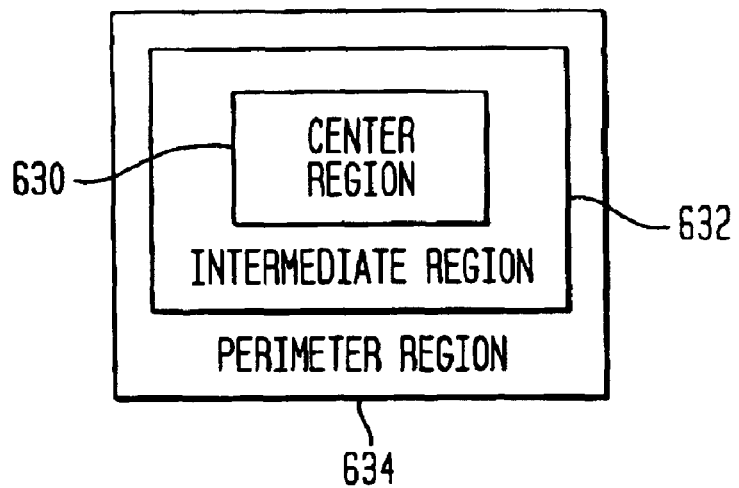

FIG. 6C shows a non-uniform illumination source array 620 according to another embodiment of the present invention. Non-uniform illumination source array 620 includes a center region 630, intermediate region 632, and perimeter region 634. In this embodiment, the density of emitters is highest in perimeter region 634 and lowest in center region 630. Intermediate region 632 has a density of emitters in between that of center region 630 and perimeter region 634. The present invention is not so limited, and additional intermediate regions can be provided to correct for natural light falloff as desired.

FIG. 6D illustrates an embodiment of a diffuse illumination system having a zone-controlled non-uniform illumination source array 650 and a light wedge 420 according to an embodiment of the present invention. Zone-controlled non-uniform illumination source array 650 has an array of emitters divided into three groups 652, 654, 656. First group 652 corresponds to a first zone (zone 1). Second group 654 corresponds to a second zone (zone 2). Third group 656 corresponds to a third zone (zone 3). In one example, group 652 and group 656 each have five emitters, while group 654 has 19 emitters. Emitters in each of groups 652, 654 and 656 are individually controlled as respective groups. This simplifies control compared to individually controlling each emitter independently but still provides enough flexibility to correct for natural light fall off or drift, so that a flat, uniform illumination of sufficient power is provided to a platen.

In each of embodiments of FIGS. 6A–6D, current control circuitry (not shown) is coupled to the individual emitters or groups of emitters as would be apparent to a person skilled in the art given this description. Such circuitry provides appropriate current levels to each emitter or groups of emitters to correct for natural light fall off or drift, so that a flat, uniform illumination of sufficient power is provided to a platen. Such current levels can be set manually or automatically in advance as part of a calibration routine and/or adjusted in real-time based on feedback from the detected images.

6. Blue/Green Illumination

In one embodiment, the present invention uses an illumination light source emitting light in the blue/green spectrum, that is, a wavelength or narrowband of wavelengths equal to or approximately equal to 510 nm, to enhance the dynamic range of grey scale shading.

The inventors have compared images of prints obtained using conventional red light operating at 650 nm and images obtained using blue/green light at 510 nm. Results obtained by the inventors indicate an approximately 14% to 20% increase in the dynamic range of grey scale shading in an image of a print of a finger or palm detected with a print scanner using blue/green light at about 510 nm. Increasing the dynamic range of grey scale shading in a detected print image further causes the print scanner to operate well over an even wider range of skin conditions (i.e., dry, wet, oily, etc.).

Figure 7:
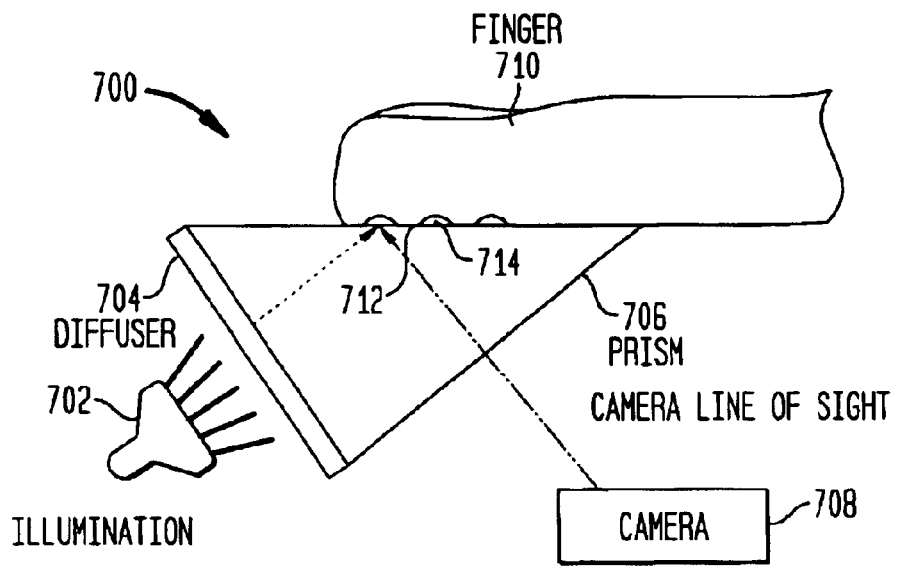
FIG. 7 is a diagram that illustrates blue/green illumination on a valley and ridge of a finger according to an embodiment of the present invention.

FIG. 7 is a diagram illustrating an illumination scheme for a print canner 700 highlighting the effect of a blue/green illumination source on a valley of a finger according to an embodiment of the present invention. Print scanner 700 comprises, inter alia, an illumination source 702, a diffuser 704, a prism 706, and a camera 708. A finger 710 is placed on a platen. In this example, the platen is a top outside surface of prism 706 or any other surface that receives illumination from the top of the prism 706. For example, the platen can be a silicone layer or other protective layer or element provided on top of or in optical contact with prism 706.

According to one feature of the present invention, illumination source 702 illuminates a blue/green light onto diffuser 704. The blue/green light has a wavelength of approximately 510 nm. Diffuser 704 distributes the illuminated blue/green light evenly through prism 706 onto finger 710. The surface of finger 710 is comprised of ridges 712 and valleys 714.

Figure 8:
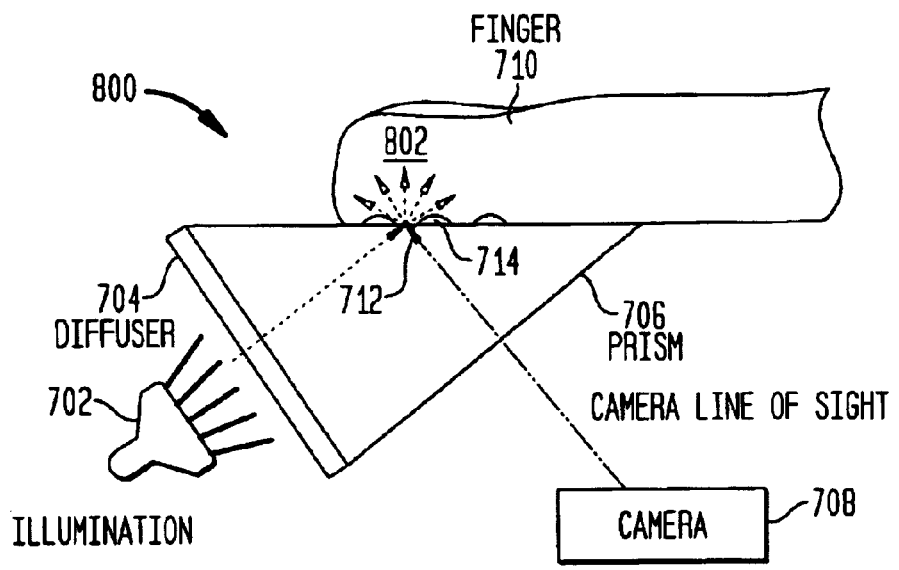
FIG. 8 is a diagram that illustrates blue/green illumination absorbed into a ridge of a finger according to an embodiment of the present invention.

When the blue/green light is incident on a platen/ridge interface at a valley 714 of finger 710, the light reflects off the internal surface of prism 706 and may be directed into camera 708. In other words, where valley 714 of finger 710 exists, the blue/green light illuminated from light source 702 exhibits total internal reflection. Blue/green light that strikes finger valley 714 is totally reflected back into the system toward camera 708. In the case of a ridge, blue/green light is absorbed for light incident on a platen/ridge interface. FIG. 8 shows the blue/green light from illumination source 702 being diffused into prism 706 and hitting ridge 712 of finger 710. When the blue/green light hits ridge 712, some of the blue/green light 802 is absorbed into finger 710. The more light absorbed into finger 710 at ridge 712, the higher the image contrast between ridge 712 and valley 714 for a fingerprint captured by camera 708. Camera 708 then detects a high contrast image representative of the valleys and ridges of a fingerprint of finger 710. For some angles, diffuse light that falls on the platen surface passes through the platen surface and illuminates a valley. Light reflected from the skin of a ridge at the proper angle, re-enters the prism and is transmitted to the sensor plane. This light enhances the grey scale range and provides a more desirable image.

According to further embodiments of the present invention, blue/green light is used to illuminate a platen in a print scanner. Such blue/green light is less than 650 nm, and is preferably at or near approximately 510 nm. Any type of platen and any type of fingerprint and/or palm print scanner can be used. In this way, images having an improved grey scale range are obtained for prints, including prints of all or part of finger(s) and/or palm(s).

7. Conclusion

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An illumination system that provides illumination for a platen in a print scanner, comprising:

an illumination source array that emits light from a plurality of discrete light sources; and a light wedge having one end surface that receives light emitted from said illumination source array and a reflective surface that reflects light out of said light wedge toward the platen, wherein said reflective surface is a diffuse, reflective surface including a roughened surface coated by a layer of reflective paint, whereby uniform illumination is provided to the platen.

2. The illumination system of claim 1, wherein said illumination source array comprises a plurality of sources that emit blue/green light.

3. An illumination system that provides illumination for a platen in a print scanner, comprising:
   an illumination source array that emits light from a plurality of discrete light sources, wherein said plurality of sources are divided into at least a center region and a perimeter region, wherein the density of sources provided in said perimeter region is greater than in said center region; and
   a light wedge having one end surface that receives light emitted from said illumination source array and a reflective surface that reflects light out of said light wedge toward the platen,
   whereby, uniform illumination is provided to the platen.

4. The illumination system of claim 3, wherein the intensity of each source can be independently controlled relative to other sources such that a flat, uniform illumination is provided to the platen.

5. An illumination system that provides illumination for a platen in a print scanner, comprising:
   an illumination source array that emits light from a plurality of discrete light sources; and
   a light wedge having one end surface that receives light emitted from said illumination source array and a reflective surface that reflects light out of said light wedge toward the platen,
   wherein said plurality of sources is divided into at least three groups in at least three respective zones, whereby, the intensity of each group of sources can be independently controlled relative to other groups such that a flat, uniform illumination is provided to the platen.

6. A method for providing efficient, uniform illumination to a platen, comprising:
   arranging a plurality of discrete light sources into at least a center region and a perimeter region, wherein the density of sources provided in said perimeter region is greater than in said center region;
   emitting light from said plurality of discrete sources;
   passing the emitted light through a light wedge to obtain diffuse light; and
   illuminating the platen with the diffuse light such that an image of a print of a finger or palm placed on the platen can be obtained.

7. The method of claim 6, wherein said emitting step includes emitting blue/green light.

8. The method of claim 6, further comprising independently controlling the intensity of each source relative to other sources such that a flat, uniform illumination is provided to the platen.

9. A method for providing efficient, uniform illumination to a platen, comprising:
   arranging a plurality of discrete light sources into at least three groups in at least three respective zones;
   emitting light from said plurality of discrete sources;
   passing the emitted light through a light wedge to obtain diffuse light;
   independently controlling the intensity of each group of sources relative to other groups of sources such that a flat, uniform illumination is provided to the platen; and
   illuminating the platen with the diffuse light such that an image of a print of a finger or palm placed on the platen can be obtained.

10. For use in a print scanner, an illumination method for improving a range of grey scale shading, comprising:
    emitting light in a blue/green spectrum from a plurality of discrete sources, wherein said plurality of sources are divided into at least a center region and a perimeter region, wherein the density of sources provided in said perimeter region is greater than in said center region; and
    illuminating a platen, having an object with a pattern of ridges and valleys thereon, with at least part of the emitted light in the blue/green spectrum.

11. The method of claim 10, wherein the blue/green spectrum comprises a single wavelength equal to or approximately equal to 510 nm or a narrowband of wavelengths that includes a wavelength of 510 nm.

12. The method of claim 10, wherein the intensity of each source can be independently controlled relative to other sources such that a flat, uniform illumination is provided to the platen.

13. The method of claim 10, wherein said plurality of sources is divided into at least three groups in at least three respective zones, whereby the intensity of each group of sources can be independently controlled relative to other groups such that a flat, uniform illumination is provided to the platen.

* * * * *

UNITED STATES PATENT AND TRADEMARK OFFICE
CERTIFICATE OF CORRECTION

PATENT NO. : 6,954,260 B2  Page 1 of 1
APPLICATION NO. : 10/050046
DATED : October 11, 2005
INVENTOR(S) : Arnold et al.

It is certified that error appears in the above-identified patent and that said Letters Patent is hereby corrected as shown below:

On the Title Page, Item (57),

In the "Abstract", line 17, "can be preformed" should appear as --can be performed--.

In the drawings, Sheet 2, FIG. 3A, the reference number --302-- should be added.

Column 2, line 35, "Discrete emitter array 210 is made up a number" should appear as --Discrete emitter array 210 is made up of a number--.

Column 8, line 15, "diffuser 302, 325 acts to" should appear as --diffuser 320, 325 acts to--; and
lines 33-34, "(that is rays 314, 316)" should appear as --(that is, rays 314, 316)--.

Column 9, line 50, "at a end" should appear as --at an end--.

Column 11, line 62, "a print canner 700" should appear as --a print scanner 700--.

Signed and Sealed this

Seventeenth Day of October, 2006

JON W. DUDAS
*Director of the United States Patent and Trademark Office*